United States Patent
Jessen et al.

(10) Patent No.: US 11,174,840 B2
(45) Date of Patent: *Nov. 16, 2021

(54) WIND POWER PLANT HAVING A PLURALITY OF WIND TURBINE GENERATORS AND A POWER PLANT CONTROLLER

(71) Applicant: VESTAS WIND SYSTEMS A/S, Aarhus N (DK)

(72) Inventors: Steve Jessen, Risskov (DK); Søren Kappelgaard, Århus N (DK); Jacob Barsøe Kjærgaard, Hinnerup (DK); Kouroush Nayebi, Ikast (DK); Mads Rajczyk Skjelmose, Risskov (DK); Mu Wei, Soljberg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/312,655

(22) PCT Filed: Jul. 5, 2017

(86) PCT No.: PCT/DK2017/050228
§ 371 (c)(1),
(2) Date: Dec. 21, 2018

(87) PCT Pub. No.: WO2018/006921
PCT Pub. Date: Jan. 11, 2018

(65) Prior Publication Data
US 2019/0338756 A1 Nov. 7, 2019

(30) Foreign Application Priority Data

Jul. 6, 2016 (DK) .............................. PA201670500

(51) Int. Cl.
*F03D 7/04* (2006.01)
*F03D 7/02* (2006.01)

(52) U.S. Cl.
CPC ............. *F03D 7/048* (2013.01); *F03D 7/028* (2013.01); *F05B 2270/335* (2013.01)

(58) Field of Classification Search
CPC ................................................. F05B 2270/335
See application file for complete search history.

(56) References Cited

U.S. PATENT DOCUMENTS

| 2008/0048501 A1 | 2/2008 | Jurkat et al. |
| 2008/0088129 A1 | 4/2008 | Altemark et al. |

(Continued)

FOREIGN PATENT DOCUMENTS

| CN | 101515722 A | 8/2009 |
| CN | 101640419 A | 2/2010 |

(Continued)

OTHER PUBLICATIONS

PCT Notification of Transmittal of the International Search Report and the Written Opinion of the International Searching Authority, or the Declaration for Application No. PCT/DK2017/050288 dated Sep. 26, 2017.

(Continued)

*Primary Examiner* — Santosh R Poudel
(74) *Attorney, Agent, or Firm* — Patterson + Sheridan, LLP

(57) ABSTRACT

A wind power plant supplies power to a utility grid in accordance with an active power reference, where the wind power plant comprises a plurality of wind turbine generators and a power plant controller arranged to send an active power set point to the wind turbine controller of each of the plurality of wind turbine generators.

8 Claims, 4 Drawing Sheets

(56) References Cited

U.S. PATENT DOCUMENTS

| | | | |
|---|---|---|---|
| 2010/0286835 A1 | 11/2010 | Nyborg | |
| 2011/0118892 A1 | 5/2011 | Mayor et al. | |
| 2011/0140428 A1* | 6/2011 | Wakata | H02J 3/386 |
| | | | 290/44 |
| 2012/0286835 A1 | 11/2012 | Yamada et al. | |
| 2013/0221671 A1* | 8/2013 | Yasugi | H02J 3/46 |
| | | | 290/44 |
| 2014/0030089 A1* | 1/2014 | Wickstrom | F03D 7/042 |
| | | | 416/1 |
| 2015/0159626 A1* | 6/2015 | Tarnowski | F03D 7/0284 |
| | | | 290/44 |
| 2015/0219075 A1* | 8/2015 | Cardinal | F03D 7/048 |
| | | | 290/44 |
| 2015/0249415 A1 | 9/2015 | Babazadeh et al. | |
| 2015/0267683 A1* | 9/2015 | Ubben | F03D 9/257 |
| | | | 290/44 |

FOREIGN PATENT DOCUMENTS

| | | | |
|---|---|---|---|
| CN | 102395784 A | 3/2012 | |
| CN | 105515061 A | 4/2016 | |
| EP | 2354541 A1 | 8/2011 | |
| EP | 2667023 A2 | 11/2013 | |
| EP | 2818697 A1 | 12/2014 | |
| EP | 2884096 A1 | 6/2015 | |
| EP | 2921699 A1 | 9/2015 | |
| WO | 2009024833 A1 | 2/2009 | |
| WO | 2013125043 A1 | 8/2013 | |
| WO | 2015118055 A1 | 8/2015 | |
| WO | WO-2015135547 A1 * | 9/2015 | G05B 19/042 |
| WO | 2016006921 A1 | 1/2018 | |

OTHER PUBLICATIONS

Ning Chen et al: "An optimal active power control method of wind farm using power prediction information", Power System Technology (POWERCON), 2012 IEEE International Conference on, IEEE, Oct. 30, 2012 (Oct. 30, 2012), pp. 1-5.

Danish Patent and Trademark Office First Technical Examination for Application No. PA 2016 70500 dated Feb. 14, 2017.

Chinese Office Action for Application No. 201780041811.8 dated Dec. 27, 2019.

Notice of Completing Formalities for Patent Registration for Application No. 201780041811.8 dated Sep. 4, 2020.

* cited by examiner

WIND POWER PLANT HAVING A PLURALITY OF WIND TURBINE GENERATORS AND A POWER PLANT CONTROLLER

FIELD OF THE INVENTION

The present invention relates to a wind power plant having a plurality wind turbine generators and a power plant controller with a dispatcher.

BACKGROUND

In an electrical utility grid, consumers can usually consume electric power in an uncontrolled manner. Since hardly any energy is stored in the grid, there can be no imbalance between the power produced and the power consumed.

Therefore, the momentary production of power shall match the momentary power consumption. Overproduction leads to an increase of the grid frequency beyond the nominal value (e.g. 50 or 60 Hz), since the conventional synchronous generators accelerate, while over consumption will lead to a decrease of the grid frequency beyond the nominal value (e.g. 50 or 60 Hz), since the conventional synchronous generators will then decelerate.

In order to stabilize the frequency of the electrical grid, conventionally about 10% of the producers contribute to what is called "primary power control". These producers, also referred to as "primary controllers", increase power output when the frequency falls below the nominal value and decrease power output when it rises above the nominal value.

Wind turbine generators (WTG) can be used to provide energy to the electrical utility grid. Wind turbine generators are sometimes referred to as wind turbines (WT). A plurality of WTGs can form a wind power plant (WPP) also known as a wind park or a wind farm.

A Power Plant Controller (PPC), which operates as a wind power plant (WPP) controller, generates proper active power set-points to all WTGs, in order to allow the plant active power follow certain active power reference on the plant level. The part of the PPC which generates the active power set-points to all WTGs is called a dispatcher. The dispatcher coordinates all kinds of control modes, for instance, frequency control mode, active power curtailment mode, active power fast de-rating control mode, and so on.

It is thus highly relevant to provide methods to control a wind power plant in a manner which ensures improved control modes by selecting and dispatching proper active power reference to a plurality of wind turbine generators in a WPP, so the aggregated active power of the power plant match the active power reference. Furthermore, it is relevant to provide a wind power plant which reacts fast to changes in the requested active power.

SUMMARY

This summary is provided to introduce a selection of concepts in a simplified form that are further described below in the Detailed Description.

The dispatching strategy described in this invention has the advantage that the plant level active power follows the plant active power reference with high accuracy. This is done in order to satisfy transmission system operator's (TSO's) Grid Integration Requirements (GIR). Fulfilling GIRs can be difficult as wind varies for each individual WTG and thus individually influence each WTG's power output differently.

A first aspect relates to method for operating a wind power plant which supplies power to a utility grid in accordance with an active power reference, the wind power plant comprises a plurality of wind turbine generators and a power plant controller arranged to send an active power set point to the wind turbine controller of each of the plurality of wind turbine generators, the method comprises the steps of:

- operating the wind power plant with an active power reference lower than a nominal active power of the wind power plant by curtailing at least some of the wind turbine generators of the plurality of wind turbine generators,
- determine a power capability of each of the curtailed wind turbine generators,
- defining a first group comprising wind turbine generators having a power capability higher than a power capability limit,
- defining a second group comprising wind turbine generators having a power capability lower than a power capability limit,
- equalize curtailment of the curtailed wind turbines generators by decreasing the active power set-point for the wind turbines generators in the first group and increasing the active power set-point for the wind turbines generators in the second group.

An embodiment of the first aspect determines a power capability of each of the curtailed wind turbine generators comprise

- calculating a positive power capability, as the difference between possible power and production power and/or
- calculating a negative power capability, as the difference between minimum power and production power.

Possible power is to be understood as the power which a WTG are able to deliver if a high enough set point were to be forwarded to it. Production power is to be understood as the power which the WTG produces at the moment. Minimum power is to be understood as the minimum possible power which the WTG can produce under normal operation conditions.

An embodiment of the first aspect is setting a constant, prior the step of equalize curtailment of the curtailed wind turbines generators, to ensure that only a portion of the power capability, defined by the constant times the power capability, is equalized in a dispatcher iteration.

An embodiment of the first aspect is limiting the decrease or the increase in the active power set-point by an equalizing limit value in a dispatcher iteration.

An embodiment wherein the step of limiting the decrease or the increase in the active power set-point is set as a minimum of the equalizing limit value and the portion of the power capability.

A second aspect relates to a wind power plant having a plurality of wind turbine generators and a power plant controller arranged to communicate with the plurality of wind turbines generators, wherein

- each wind turbine generator in the plurality of wind turbine generators being related to a wind turbine controller, the wind turbine controller being arranged to control an active power output in its related wind turbine generator according to an active power set point received from the wind power plant controller;
- the wind power plant supplies power to a utility grid in accordance with an active power reference;

the wind power plant having an active power reference lower than a nominal active power of the wind power plant, such that at least some of the wind turbine generators of the plurality of wind turbine generators are curtailed, each of the curtailed wind turbine generators have a power capability, the curtailed wind turbine generators are comprised in,
 a first group comprising wind turbine generators with a power capability higher than a power capability limit, or
 a second group comprising wind turbine generators having a power capability lower than a power capability limit, and the wind turbine controller being arranged to equalize curtailment of the curtailed wind turbines generators by decreasing the active power set point for the wind turbines generators in the first group and increasing the active power set point for the wind turbines generators in the second group.

The individual aspects of the present invention may each be combined with any of the other aspects. These and other aspects of the invention will be apparent from the following description with reference to the described embodiments.

Any of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE FIGURES

The wind power plant and its method according to the invention will now be described in more detail with regard to the accompanying figures. The figures show one way of implementing the present invention and is not to be construed as being limiting to other possible embodiments falling within the scope of the attached claim set.

DETAILED DESCRIPTION OF THE EMBODIMENTS

The embodiments of the present invention pertain to a wind power plant with a plurality of wind turbine generators (e.g. a variable-speed wind turbine generator). The plurality of wind turbine generators (WTG) may form a wind power plant (WPP). The wind power plant seeks to produce an aggregated power from all the wind turbine generators, and to ensure that the measured power (P_measurement) at the Point of Common Coupling (PCC) is equal to the desired power (P_reference) at the PCC. This is done by dispatching individual or common power set-points to each of the WTG. In other words, the PPC receives a request for a specific output power for the WPP and by measuring the power at the PCC it can determine if it fulfills the request. If not then the PPC change the power set point values for the WTGs.

Figure 2:
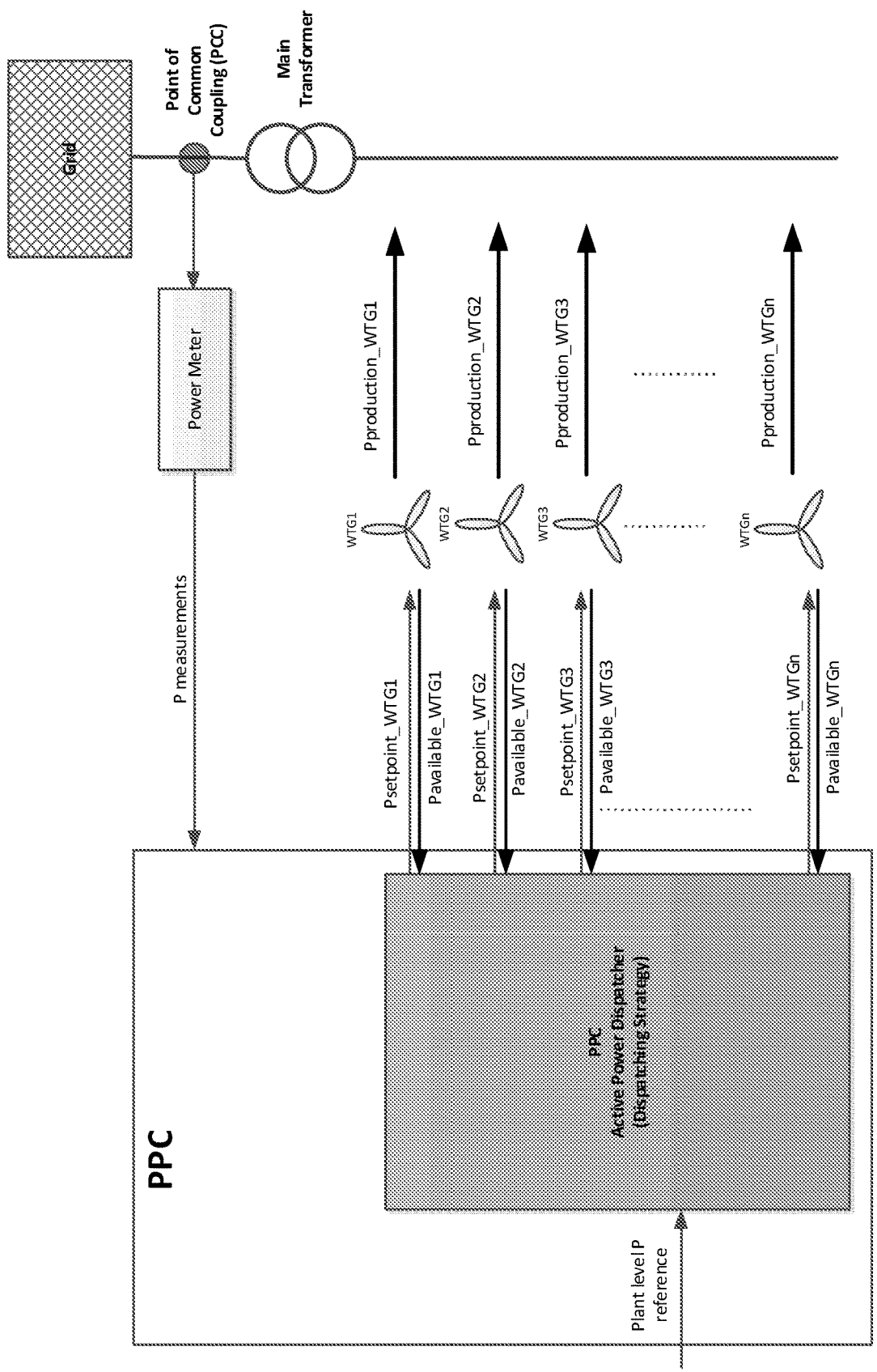
FIG. 2 shows an embodiment of a dispatcher.

The way the Power Plant Controller (PPC) generates the active power set-points for the WTGs is one of the most essential control functions inside the PPC. As shown in FIG. 2, using the dispatching strategy, the PPC active power dispatcher splits the plant level active power reference into different active power set-points for each WTG (Psetpoint_WTG1 . . . WTGn). These set-points may be different for each WTG in the WPP or identical for a two or more of the WTGs in the WPP.

From the whole wind power plant point of view, WTGs are utilized as actuators for active power (P) control. The WTGs' set-points generated by an active power dispatcher are approached by WTGs with certain ramp rate, when the wind conditions allow. However, if the wind conditions prevent the WTGs to produce the requested active power production, then the dispatching strategy needs to be robust enough to adjust the active power set-points. Therefore each WTG's different wind conditions may also be utilized by the dispatching strategy. By doing this, the WTGs with high available power are allowed to produce more power to compensate the WTGs with low available power. The coordination between the PPC dispatcher and the WPP power system, using WTGs as actuators, is shown in FIG. 2.

An objective of the dispatcher is to ensure that the demanded power (e.g. from the Transmission System Operator (TSO)) is delivered as fast as possible, this applies both to increase and decrease in the active power reference. Thus the objective of the dispatcher can be seen as a method for controlling power ramp rates.

An issue of the prior art is the design principle for equalizing WTG set points sample by sample. The prior art equalizing set-points principle has the following problems:

a) Equalizing WTG set-points causes low wind turbines to be running at possible power where as high wind turbines will be curtailed. This will cause losses as well as reduce the wind farm ability to respond to step change where production need to increase as turbines already producing at possible power will not be able to perform.

b) When a wind farm is curtailed and one or more WTGs come out of de-rate (e.g. due to single WTG de-rate or feeder limits) or are released from pause mode, the rest of the WTGs will reduce power to maintain the active power set point of the power plant. Because these WTGs usually reach their set point before the WTG(s) coming out of curtailment, a dip in power can occur.

c) When starting up the WPP and when turbines are changing from pause to run mode, after a few turbines are running, a set point that is too high will be calculated for the consecutive turbines starting to produce. At this time the production running turbines will need to be decreased while new turbines are ramping up to meet the average set point. As running WTGs will likely have further to ramp down compared to the starting WTGs ramping up, an overshoot can occur.

Where in one aspect the dispatcher communicates active power set-points to the WTGs based on a set of weighting factors.

The dispatcher uses in some embodiments the surplus of available power from a first subset of wind turbine generators inside a wind power plant to compensate for the lack of power in a second subset of wind turbine generators, thus regulating the WPP power output to a desired value.

In other words, the first subset of wind turbine generators can be controlled in order to compensate the fluctuations in the second subset of wind turbine generators, with the overall objective of ensuring the desired value of total power output from the wind power plant.

Figure 1:
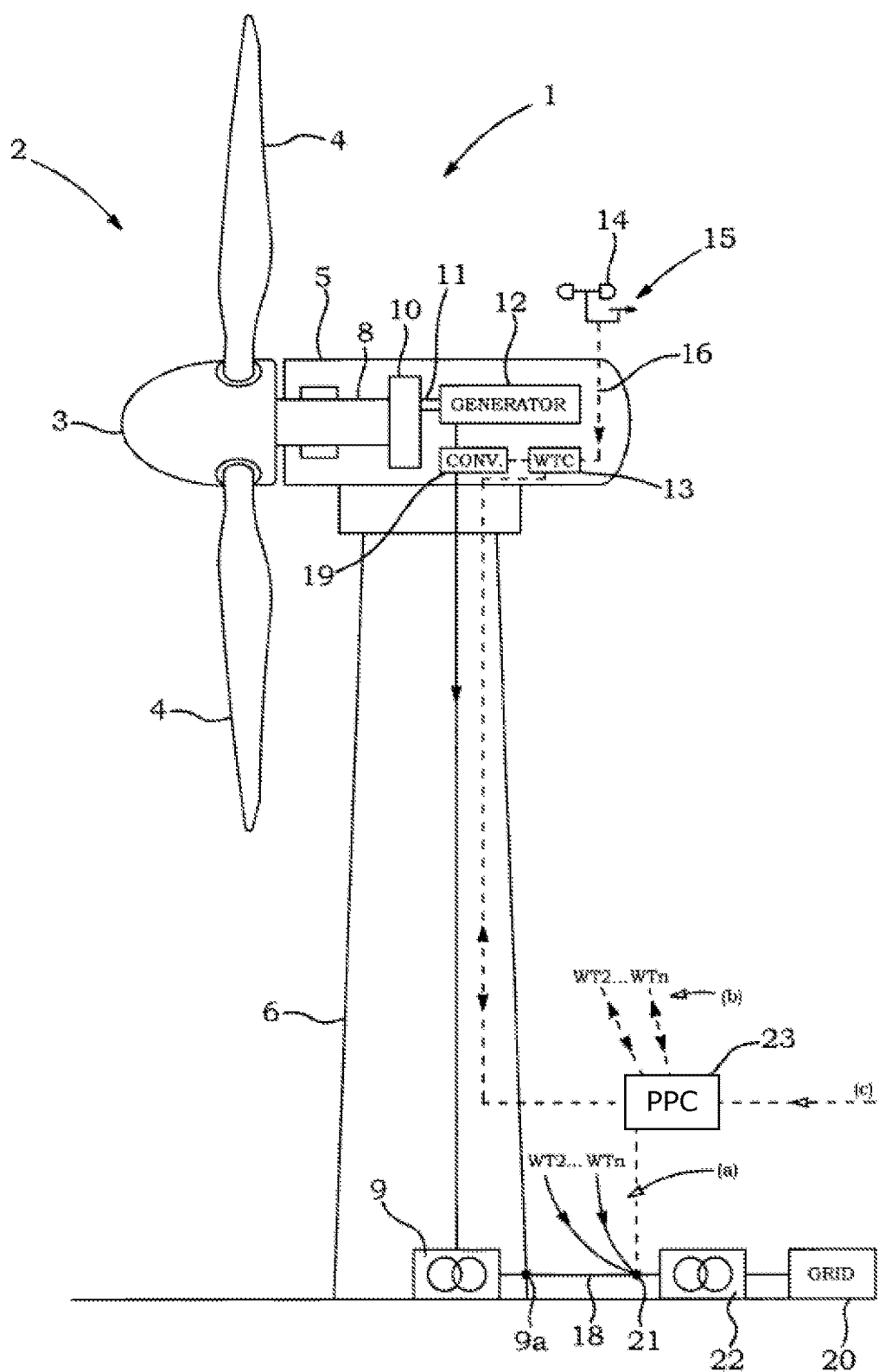
FIG. 1 shows a wind turbine generator according to the present invention.

FIG. 1 shows, an exemplary variable-speed wind turbine generator (WTG) 1 is one of a plurality of wind turbine generators of a wind power plant (WPP) 2. It has a rotor 3 with a hub to which, e.g., three blades 4 are mounted. The pitch angle of the rotor blades 4 is variable by means of pitch actuators. The rotor 3 is supported by a nacelle 5 and drives a generator 12 via a main shaft 8, a gearbox 10, and a high speed shaft 11. This structure is exemplary; other embodiments, for example, use a direct-drive generator.

The generator 12 (e.g. Induction or synchronous generator) produces electrical output power of a frequency related to the rotation speed of the rotor 3, which is converted to grid frequency (e.g. about 50 or 60 Hz) by a converter 19. The voltage of the electric power thus produced is up-transformed by a transformer 9. The output of the transformer 9 is the wind turbine generator's terminals 9a. The electric power from the wind turbine generator 1 and from the other wind turbine generators (WT2 . . . WTn) of the wind power plant 2 is fed into a wind power plant grid 18 (symbolized by "a" in FIG. 1). The wind power plant grid 18 is connected at a point of common coupling 21 and an optional further step up transformer 22 to a wind power plant external electrical utility grid 20. The grid 20 can be equipped with regulation capacity against grid-frequency fluctuations, e.g. in the form of conventional producers which can increase and lower production on a short-time scale to control frequency.

A control system includes a wind turbine controller 13 and a wind power plant controller (PPC) 23. The wind turbine controller 13 controls operation of the individual wind turbine generator 1, e.g. selects full-load or partial-load operation modes, depending i.a. on the current wind speed. In the partial load mode, operation of the wind turbine generator at the optimal working point by adjusting the blade angle and controlling the tip speed ration to the aerodynamic optimum at the current wind speed, and controls the converter 19 to produce electricity according to prescriptions of the power plant controller 23, e.g. an instruction to provide a certain amount of active power and/or a certain amount of reactive power in addition the active power, etc. The wind turbine controller 13 uses different input signals to perform its control tasks, for example signals representing current wind conditions (e.g. from an anemometer 14 and a wind vane 15), feed-back signals representing pitch angle, rotor position, amplitudes and phases of the voltage and current at the generator 12 and the terminals 9a, etc., and command signals from the wind power plant controller 23. The power plant controller 23 receives signals representative of the voltage, current and frequency at the point of common coupling 21 (parameters which may be considered to represent the voltage, current and frequency in the utility grid 20) and receives information, requirements or command signals from a TSO or another operator (at "c" in FIG. 1). Based on some of these and, optionally, further input parameters the power plant controller 23 monitors the grid 20 and, upon detection of a non-compliance with the commands from a TSO or non-compliance with any other grid requirement, the PPC 23 may command the wind turbine controllers 13 of the wind turbine generator 1 and the other wind turbine generators of the wind power plant 2 (at "b" in FIG. 1) to change operation of the output power supplied. Upon receipt of such a command the wind turbine controller 13, may adjust the power output e.g., by adjusting the blade-pitch angle, to comply with the wind-park controller's command. Thus, in the exemplary embodiment of FIG. 1 the control task of the control system to ensure that the TSOs Grid Integration Requirements are complied with. In other embodiments this control task is performed by the wind turbine controller 13 alone; in those embodiments, the "control system" is represented just by the wind turbine controller 13, without a power plant controller 23. In these embodiments the wind turbine controllers 13, so to speak, take over the functionality of the PPC 23.

Although the wind turbine generator 1 shown in FIG. 1 is expected to have three blades 4, it should be noted that a wind turbine generator may have different number of blades. It is common to find wind turbine generators having two to four blades. The wind turbine generator 1 shown in FIG. 1 is a Horizontal Axis Wind Turbine (HAWT) as the rotor 4 rotates about a horizontal axis. It should be noted that the rotor 4 may rotate about a vertical axis. Such a wind turbine generators having its rotor rotate about the vertical axis is known as a Vertical Axis Wind Turbine (VAWT). The embodiments described henceforth are not limited to HAWT having 3 blades. They may be implemented in both HAWT and VAWT, and having any number of blades 4 in the rotor 4.

FIG. 2 exemplifies the arrangement of the calculation modules inside a dispatcher. It can be seen that the dispatcher is disclosed as being part of a PPC. The dispatcher receives a plant level P reference that in the Active power dispatcher module calculate the active power set point Psetpoint WTG1 . . . WTGn, based on a plurality of status feedback signals Pavailable_WTG1 . . . WTGn. Where Pavailable_WTG is the active power available from a specific WTG at the given time, calculated based on the current wind speed and other parameters limiting the WTG production, and the available active power of the power system is therefore the aggregated Pavailable_WTG1 . . . WTGn for all the WTGs. The actual production (production power) of the WTGs Pproduction_WTG1 . . . WTGn is fed to a feeder line, which is connected to a Point of common coupling (PCC) via a transformer. At the PCC the aggregated active power production is measured by means of a power meter. The measured active power (P measurement) is communicated to the PPC. Throughout this description, active power reference is used for the demanded power for the wind power plant, whereas active power set-point is used for the demanded power for the individual WTG.

The wind turbine generator (e.g. a variable-speed wind turbine generator) which supplies power to an electric grid which may be equipped with regulation capacity against grid-frequency and active power fluctuations. "Electric grid" or "grid" is a utility grid outside the boundary and point of common coupling of a wind power plant; when reference is made to the grid within a wind power plant an expression with explicit indication to the wind power plant is made, e.g., "wind-park grid".

As the present text deals with active power rather than reactive power, active power is briefly referred to as "power", or "output power". Where reactive power is addressed, it is explicitly referred to as "reactive power". Although the claims refers to active power, implicitly this also means that a change in a reactive power reference, voltage or frequency (or other changes) may, depending on the circumstances, result in a change in the active power reference, as these measures are linked.

There is an upper limit to the output power which can be produced by the wind turbine generator according to the embodiments, e.g. due to structural limits and a current limit in the wind turbine generator's electric converter. This amount of power is referred to as "nominal power". The wind speed sufficient for the wind turbine generator to produce the nominal power is referred to as "nominal wind speed". When the wind turbine generator according to the embodiments operates at wind speeds above the nominal wind speed, only a fraction of the available wind power is transformed to electric output power which corresponds to the nominal power. This reduction of power production is, e.g., achieved by gradually changing the rotor-pitch angle towards the so-called flag position. In other words, the wind turbine generator intentionally is not operated at optimum efficiency. In some embodiments the wind turbine generator is also operated at a sub-optimal tip-speed ratio so as to reduce structural loads.

By contrast, during operation in partial load, at a wind speed below the nominal wind speed, the wind turbine generator according to the embodiments is operated at optimum efficiency. Meaning that it is operated with the aerodynamically optimal blade pitch angle and tip-speed ratio.

In relation to control of the power plant (performed by the PPC) there are several factors which can have negative impact on the PPC's active power dispatching, and thus prevent an accurate control of the WPP. For example, each WTG may not necessarily be able to follow the active power set-point even if the wind speed is high enough for the required production. The can be due to specific conditions in the turbine such as: A comparability problem between the communication delays on the WTGs' feedback signals and the PPC active power control loop time, an inaccuracy of the WTGs' feedback signals generated from WTGs, uncertainty in the starting up duration for the WTG. Due to these issues the PPC's active power control encounters significant challenges. Therefore, the active power dispatching strategy has been focused and developed with these issues in mind.

In an embodiment wherein the P_reference changes, e.g. that the WPP needs to deliver more or less power. The PPC then needs to dispatch new power set-points to the WTGs in order to comply with the demanded power.

In case where the P_reference is increased it is based on the aggregated P_available such that the WTG contribute to the increased power by a weighting factor which depends on a relationship between the WTGs available power and the available power of the entire plant.

In case where the P_reference is decreased it is based on the P_produced such that WTG decrease its contribution to the WPP output by a weighting factor which depends on a relationship between the WTGs produced power and the power produced of the entire plant. E.g. depends on the fraction P_produced for a WTG divided by the power produced by the WPP.

These embodiments differs in that the turbines in the embodiments contribute to the increase or decrease in power based on their total available power such that the WTGs that are able to contribute the most do so.

In an embodiment the weighting factor is identical for a plurality of the WTGs. In a further embodiment, the weighting factors are different for each wind turbine generator.

In an embodiment, the weighting factor further depends on an estimated wear of each wind turbine.

The active power reference change may be shared by the weighting factors, according to each WTGs available wind power size or power production size contributing to the whole plant available wind power or the whole site power production. In other words, if a WTG's P_available (or P_production) contributes 10% of the plant level total available wind power (or total P_production), then WTG' may be sharing 10% of the active power reference change.

Figure 5:
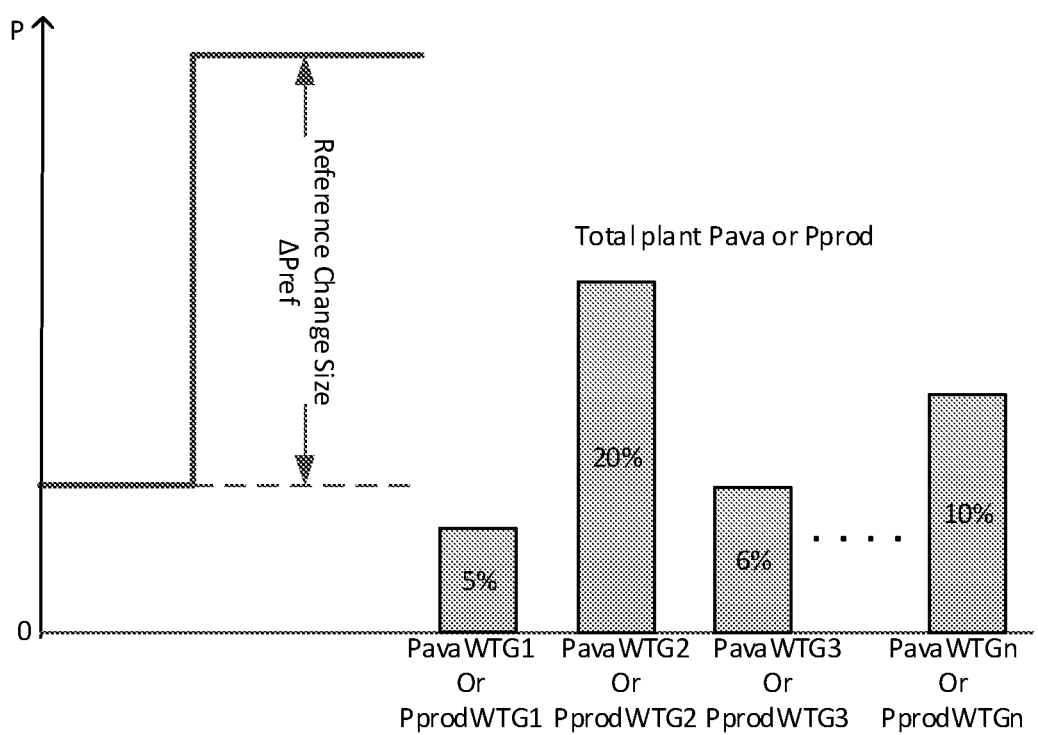
FIG. 5 shows reference change sharing priority.

FIG. 5 illustrates how a change in active power reference (ΔPref or ΔP_reference) is shared among the WTGs, the percentage of each WTG's Pava (P_availble) or Pprod (P_production) contributing to the total plant Pava (P total P_available) or total Pprod (total P_production) is used as a factor to calculate the WTG's set point. The example of a WTG which contributes 10% is seen for the WTG in the right side of FIG. 5.

It is also possible to use an algorithm in the strategy where weighting factors are not used. It means all WTGs no matter their Pava or Pprod are high or low, they are treated relatively equally, there can be mainly two ways of the equalization:

First way, all the WTGs initially get equal set-point. However, the WTGs with higher Pava or Pprod have to compensate the WTGs with lower Pava or Pprod. Thus the initial equalized set-point will be adjusted by comparing with their Pava or Pprod, this adjustment can have several rounds of iterations until either Pref is reached, or all WTGs reach their Pava limit.

Figure 3:
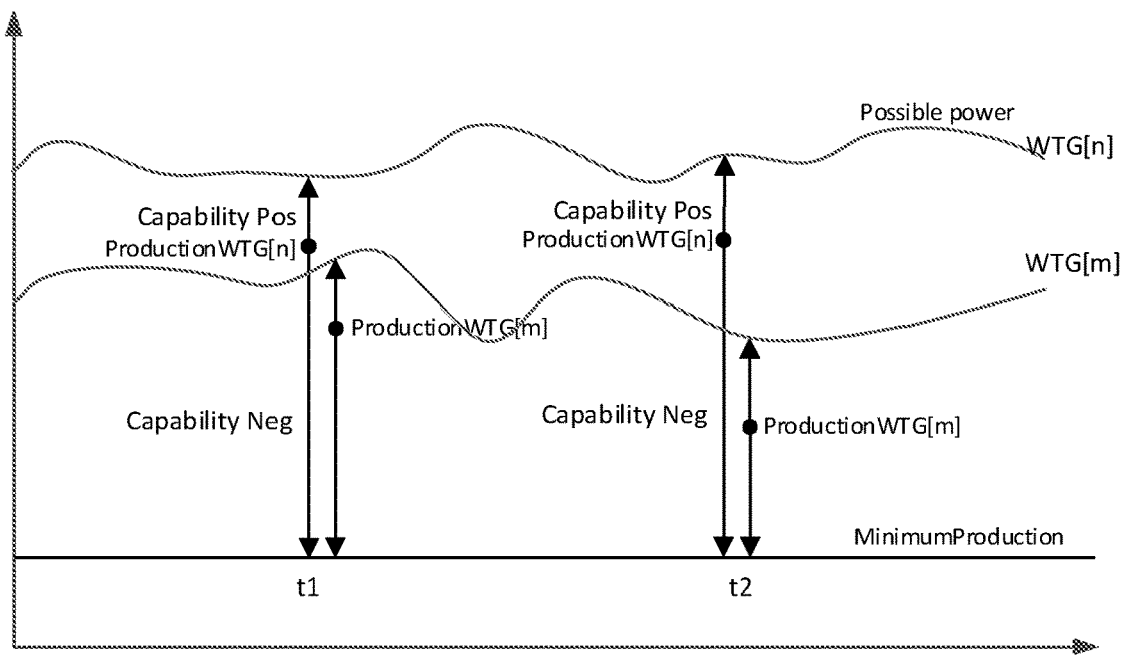
FIG. 3 shows curve with equalized curtailment.

Second way, all the WTGs equalize the curtailment in kW or MW or percentage or p.u., so that the WTGs production over time will level towards the same average reduction from available/possible power to actual power production. As shown in FIG. 3, PcurtailWTGn at t1=PcurtailWTGm at t1, and similarly PcurtailWTGn at t2=PcurtailWTGm at t2.

This method will reduce the set-point of the high producing WTGs while increasing set-points for the low producing turbines with high production capability so that turbines equally share the production reduction.

When to use the different modes such as weighting factor dispatcher or the equalized curtailment dispatcher can be defined in the strategy, and it is possible to shift among the different curtailment strategies. As an example, in the P control loop the active power reference (Pref) and the active power measurement Pmeas are compared by establishing the difference, this difference is termed as Perror (i.e. Perror=Pref−Pmeas). If the Perror is big, then the weighting factor dispatcher can be used, if Perror is small, then the equalized curtailment can be used. Besides the Perror, other indexes can also be used to decide when to use the weighting factor dispatcher or the equalized curtailment dispatcher. It is also possible to use more than one index to decide when to shift the curtailment modes.

In an embodiment the different modes: weighting curtailment and the equalized curtailment are both used and an index decides when to change mode.

In an embodiment the index is the power error, Perror, often the Perror is used the absolute value of the difference, i.e. without the sign.

Curtailment is defined by the active power set point being below nominal power.

Two subsets are used for handling turbines during steady state control, a control subset and non-control subset. Turbines in the control subset are turbines that are controllable and have control capability whereas turbines in the non-control subset are turbines having poor or no controllability. During steady state control all WTGs have their respective capability constantly evaluated to update the control and non-control subsets. A WTG is moved to the non-control subset under either of the following conditions:

1. It is producing less than Pmin
2. Its positive capability is less than a predetermined value WTGs in the non-control subset are given a set-point of Pmin if their production is less than minimum power, Pmin and given Possible power/Available power (plus PercentageOverNominalPower) otherwise. They are moved back to the control subset if their positive capability increases above the controllable level. The predetermined value is a WTG specific value, which may reflect the capability of the turbine; for example, the turbine can have a low ramp rate when operating below a specific power output meaning that it will not be suitable for regulating to power reference. The predetermined value may also be chosen in order to regulate the number of turbines in the non-controllable subset.

In an embodiment a third non-communication subset is also used in all states to handle turbines which cease communication.

In Steady-State Control the dispatching strategy focuses on controlling the turbines to optimize the dynamic capability and is the strategy used during steady state control of the wind farm. In an embodiment the strategy is to equalize the WTG production.

In an embodiment a distribute demand function distributes the active power demand (as Pref−Pmeasured) from the control loop to the WTGs based on their capability. When dispatching positive demand, i.e. increasing wind farm power, the turbine with the highest positive capability (Ppossible−Pproduction) is increased first with a weighted set point. The following next will be increased with a weighted lower set point and so on. This way the demand will be distributed to each WTG based on its capability.

For dispatching negative demand, the turbine set point will be adjusted according to their negative capability (measurement-minimum power).

For a positive demand where the wind farm production must increase the demand is distributed as:

$$\text{ActivePowerSP}_{WTG}[n] := \text{PProduction}_{WTG}[n] + \text{demand} * \text{CapabilityPos}_{WTG}[n]/\text{TotalCapabilityPos}$$

where n is the index of the WTGs

For negative demand where the wind farm production must decrease the demand is distributed as $$\text{ActivePowerSP}_{WTG}[n] := \text{PProduction}_{WTG}[n] + \text{demand} * \text{CapabilityNeg}_{WTG}[n]/\text{TotalCapabilityNeg}$$

In an embodiment the power output from the WPP is generated in such a way that each WTG or each WTG in the control subset is curtailed based on a set power curtailment or a set fraction of its available active power. Thus, the curtailed power for each of the WTG or each WTG in the control subset will then either be identical or the same percentage of available active power for that WTG. In both; the result is that the WTG with the highest available active power will contribute the most to the WPP power output.

In a further embodiment, the available turbines are divided in two groups where one group will comprise controllable turbines and the other group will comprise the non-controllable turbines. Only the controllable turbines will have equalized curtailment.

In case of high wind; the controllable turbines have set-points close to their possible power. Thus, selected turbines can be moved from the controllable groups to the non-controllable groups and be assigned nominal power. This may be achieved by having an additional clause for moving WTGs into the non-control subset or by setting the predetermined value such that the desired number of turbines is moved to the non-control subset. This is to increase the capability of the remaining controllable turbines by increasing the span between possible power and production reference. Furthermore this will avoid running turbines curtailed and close to possible power.

This embodiment of the equalized curtailment does not require all WTGs running equalized curtailment as some turbines may be running with nominal set-point, but all curtailed turbines will be controlled towards the equalized curtailment.

In an embodiment, only a subset of the curtailed turbines in the WPP form part of the WTGs that are equalized.

The advantages of this embodiment is fast reaction and accuracy in active power. As the curtailment is equalized, meaning that the WTG which are curtailed are curtailed by the same amount of active power.

The equalize capability strategy maximizes the wind farm performance capability by attempting to ensure all controllable WTGs have the same positive active power capability. The aim is that when demand increases, all the controllable WTGs are able to ramp to comply with the new demand. Further, high producing turbines will decrease while low producing turbines with high wind will increase, such that over time all running WTGs will converge towards the same average positive capability.

FIG. 3 shows an example of the equalized curtailment for WTG(m) and WTG(n), where m and n are index numbers of the WTGs. The possible power as a function of time is shown for both WTGs, where WTG(n) has a higher possible production compared to WTG(m). Production is shown for time t1 and time t2.

The WTG at positions m and n are compared, and capability is transferred between the two:

$$\text{CapToMove} = \min(\text{EQ\_Limit}, \text{abs}(\text{PosCapError}N*k), \text{abs}(\text{PosCapError}M*k))$$

$$\text{ActivePowerSP}_{WTG}[m] := \text{ActivePowerSP}_{WTG}[m] + \text{CapToMove}$$

$$\text{ActivePowerSP}_{WTG}[n] := \text{ActivePowerSP}_{WTG}[n] - \text{CapToMove}$$

Where "CapToMove" is the capability, meaning the power or the power set point, which are moved from turbine n to m. The constant "k" is there to ensure that only a portion of the power difference is equalized by each dispatcher iteration.

In an embodiment the portion defined by the constant k is 20%, thus k=0.2 and the EQ_Limit=50 kw.

Therefore in the static state the turbines n and m will then have equal curtailment after five dispatcher iteration. The real world is not static and therefore the constant "k" helps minimizing oscillations in the algorithm. "k" may be understood as the length of the steps for each iteration.

Further, "PosCapErrorM" is not an actual error, but denotes the difference between the positive capabilities of the turbine M in relation to the average positive capability of the WTGs. It is important to emphasize that the capability here means the ability to deliver power.

The constant k allows the convergence to slow proportionally as WTGs approach the average capability and avoid oscillating around the target value.

In practical terms the control subset is sorted two ways from highest to lowest based on the difference between the WTG's positive capability and the average capability of all controllable WTGs.

Figure 4:
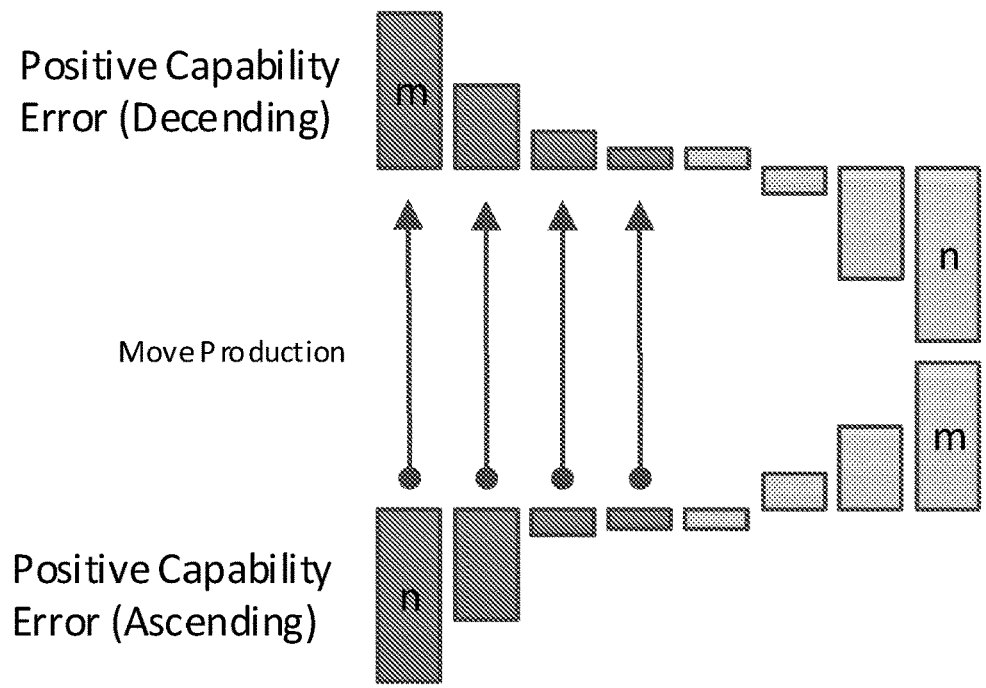
FIG. 4 shows sorting of the WTGs.

This can be seen in FIG. 4, where the upper part of the Figure shows the sorting of the WTGs in respect of positive capability error starting from WTGm in the left side descending to WTGn in the right side. The lower part of the Figure shows the sorting in the opposite direction, ascending from WTGn to WTGm. So in a situation where the curtailment is going to be equalized power can be moved from WTGn to WTGm or reverse. Thus, each column represents a WTG, and each WTG is represented in in both the upper and the lower row. The arrow shows that a specific amount of production is moved from one turbine to another. In other words that an amount represented by the column is subtracted from one turbines power set point and added to another turbines power set point. Hereby equal curtailment is achieved.

The amount of capability moved may be further limited such that neither WTG will be sent to the non-control subset. In the event that no capability can be transferred, the limiting WTG will be ignored and the capability will be transferred with the next WTG in the list.

In an embodiment where a WTG has stopped communicating, the WTG is moved to a separate non-communication subset to be ignored by whichever dispatching strategy is being used, as the WTG does not provide a controllable change in its power production.

It will be understood that the benefits and advantages described above may relate to one embodiment or may relate to several embodiments. It will further be understood that reference to 'an' item refer to one or more of those items.

The invention claimed is:

1. A method for operating a wind power plant which supplies power to a utility grid in accordance with an active power reference, the wind power plant comprises a plurality of wind turbine generators and a power plant controller arranged to send an active power set point to a wind turbine controller of each of the plurality of wind turbine generators, the method comprising:
    operating the wind power plant with the active power reference lower than a nominal active power of the wind power plant by curtailing at least some of the wind turbine generators of the plurality of wind turbine generators,
    determining a power capability of each of the curtailed wind turbine generators,
    defining a first group comprising wind turbine generators of the curtailed wind turbine generators having a power capability higher than a power capability limit,
    defining a second group comprising wind turbine generators of the curtailed wind turbine generators having a power capability lower than the power capability limit, and
    decreasing the active power set point for the wind turbine generators in the first group and increasing the active power set point for the wind turbine generators in the second group such that a power production of the wind turbine generators in the first group is reduced according to an average reduction from the power capability of the first group and such that a power production of the wind turbine generators in the second group is reduced according to the average reduction from the power capability of the second group.

2. The method according to claim 1, wherein, determining a power capability of each of the curtailed wind turbine generators comprises at least one of:
    calculating a positive power capability, as the difference between possible power and production power;
    calculating a negative power capability, as the difference between minimum power and production power.

3. The method according to claim 2, further comprising limiting the decrease or the increase in the active power set point by an equalizing limit value in a dispatcher iteration.

4. The method according to claim 3, wherein limiting the decrease or the increase in the active power set point is set as a minimum of the equalizing limit value and a portion of the power capability.

5. The method according to claim 1, further comprising setting a constant, prior the step of decreasing the active power set point for the wind turbines generators in the first group and increasing the active power set point for the wind turbines generators in the second group, to ensure that only a portion of the power capability, defined by the constant times the power capability, is equalized in a dispatcher iteration.

6. The method according to claim 1, wherein the power capability limit is a median or average power capability of the curtailed wind turbine generators.

7. The method according to claim 1, wherein the number of wind turbine generators in the first group and the second group are substantially equal.

8. A wind power plant having a plurality of wind turbine generators and a power plant controller arranged to communicate with the plurality of wind turbines generators, wherein:
    each wind turbine generator in the plurality of wind turbine generators being related to a wind turbine controller, the wind turbine controller being arranged to control an active power output in its related wind turbine generator according to an active power set point received from the wind power plant controller;
    the wind power plant supplies power to a utility grid in accordance with an active power reference;
    the active power reference lower than a nominal active power of the wind power plant, such that at least some of the wind turbine generators of the plurality of wind turbine generators are curtailed;
    each of the curtailed wind turbine generators have a power capability;
    the curtailed wind turbine generators comprise:
        a first group comprising wind turbine generators with a power capability higher than a power capability limit; and
        a second group comprising wind turbine generators having a power capability lower than the power capability limit, wherein the wind turbine controller is arranged to decrease the active power set point for the wind turbines generators in the first group and increase the active power set point for the wind turbines generators in the second group such that a power production of the wind turbine generators in the first group is reduced according to an average reduction from the power capability of the first group and such that a power production of the wind turbine generators in the second group is reduced according to the average reduction from the power capability of the second group.

* * * * *